Aug. 27, 1957     C. A. DAMM     2,804,115
BOLT CARRIED MULTI-LAYER LOCKING PLUG
Filed Dec. 6, 1954
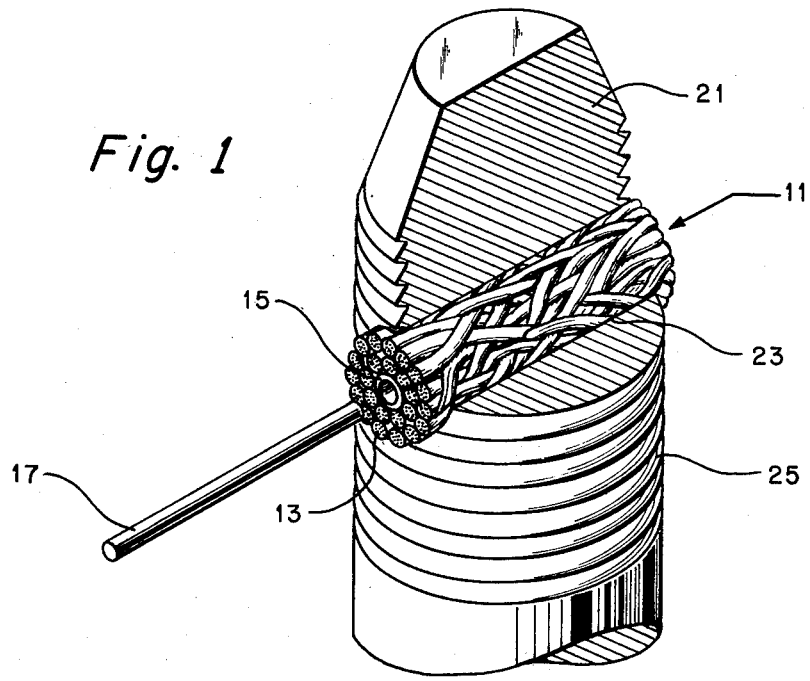
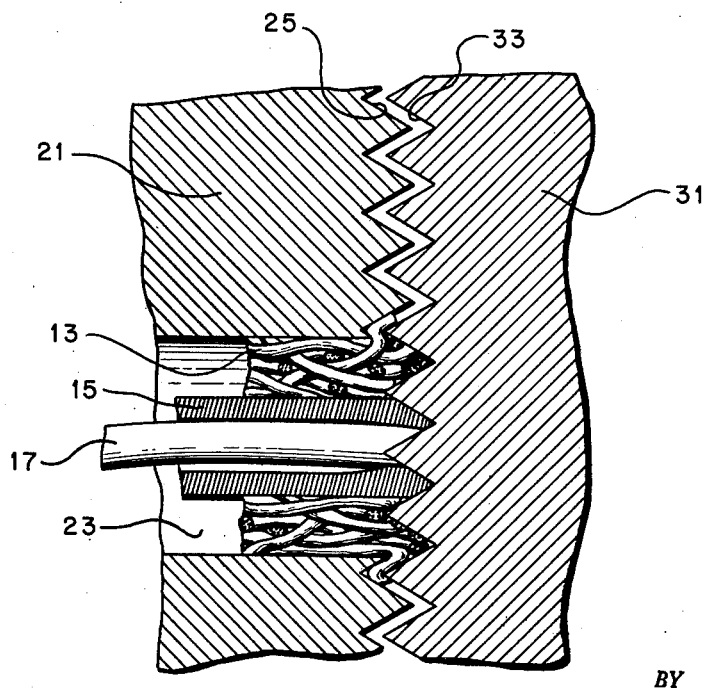
INVENTOR.
CARL A. DAMM
BY
*F. Schmitt*
*H. F. Ross*
ATTORNEYS

United States Patent Office 2,804,115
Patented Aug. 27, 1957

2,804,115

BOLT CARRIED MULTI-LAYER LOCKING PLUG

Carl A. Damm, Upper Black Eddy, Pa.

Application December 6, 1954, Serial No. 473,497

2 Claims. (Cl. 151—7)

(Granted under Title 35, U. S. Code (1952), sec. 266)

The invention decribed herein may be manufactured and used by the Government of the United States of America for governmental purposes without the payment of any royalties thereon or therefor.

The present invention relates to an internal thread locking plug and more particularly to an internal thread locking plug effective to restrain threadably engaged elements from relative movement under adverse service conditions including severe vibration loads.

One known device of this type used for securing threaded lugs in internally threaded blind holes consisted of an elongated homogeneous solid fiber plug inserted through and extending laterally away from the threads of a lug, so that as the lug was screwed into the hole the propecting portions of the plug would bite into the internal threads of the hole and act as a frictional brake shoe to resist rotation of the lug relative to the element containing the hole especially under vibration loads. This device and other known devices for the same purpose shared a common disadvantage in that they demonstrated only limited effectiveness under severe vibration which rendered them inadequate for certain critical applications.

The present invention contemplates an improved thread locking plug which is non-homogeneous and is instead composed of concentric layers of different materials. A thread locking plug constructed according to the teachings of the present invention may be conveniently fabricated by selecting a suitably sized generally cylindrical "rawl plug," which is commercially available, consisting of an elongated tubular lead core encircled by a tubular jacket of braided jute fibers, and combining it with a rod having substantially the same length as the plug, and which is inserted loosely within the core of the "rawl plug". The rod is of a material possessing suitable elasticity and tensile strength, and preferably comprises a length of aluminum wire or the like. The inclusion of the rod taken in combination with the tubular lead core and braided jute fibers demonstrated an increased effectiveness to resist rotation under most severe vibration stresses over that obtained for currently available thread locking plug devices.

An object of the present invention is the provision of a thread locking means with increased resistance to vibration loads.

Another object is to provide a thread locking means which can be fabricated readily from commercially available items.

A final object of this invention is the provision of a thread locking means comprising a non-homogeneous elongated plug member composed of concentric layers of dissimilar materials, so arranged that they co-act to produce substantially increased resistance to relative rotary movement of inter-engaged threaded elements.

The exact nature of this invention as well as other objects and advantages thereof will be readily apparent in consideration of the following description relating to the annexed drawing, in which:

Fig. 1 shows a partially cut-away isometric view of a typical installation of the device comprising the present invention, and Fig. 2 illustrates a cross-sectional view broken away and substantially enlarged to show the present invention in operative engagement with an internal thread.

Referring now to the drawing, wherein like reference characters designate like or corresponding parts throughout the several views, Fig. 1 illustrates a typical application of the internal thread locking means which comprises the present invention and is generally designated in Fig. 1 by the reference numeral 11. The elongated cylindrical plug 11 including the tubular jacket 13 of woven fibrous material such as braided jute fiber or similar material, a tubular element 15 of malleable material such as lead or the like, and an elongated solid rod 17 of resilient material such as aluminum or the like, is placed in operable relation to a stud or bolt 21 by its insertion in a cylindrical hole 23 drilled through the threaded position of bolt 21 so that it intersects and extends perpendicular to the longitudinal axis of the bolt in the manner of a cotter pin hole. It should be understood that for each bolt diameter there will be a corresponding suitable plug diameter, so that the size of the plug both as to its diameter and its length must be varied as necessary to suit the bolt to which it is intended to be used.

The enlarged detail shown in Fig. 2 is a semi-schematic representation of a portion of a stud 21 in engagement with a portion of an object 31 provided with a hole therein having internal threads 33 thereon for engagement with the threads 25 of the stud 21. To facilitate the showing in Fig. 2 of the distortion of the parts 13, 15, and 17 of the plug 11 as the threads 25 of a stud 21 are engaged with the internal threads 33 in an object 31, the respective threads are represented by a somewhat conventionalized showing rather than an exact representation of their actual positions in which one set of faces of the threads 25 would be in contact with one set of faces of the threads 33 when a load is applied to the stud 21.

In operation, the plug 11, which must be slightly longer than the diameter of a bolt in which it is used, projects at both ends beyond the major diameter of the threaded portion of a bolt 21 in the manner illustrated in Fig. 1, the major diameter being the maximum outside diameter of the screw thread. Accordingly, as the bolt 21 is threadably engaged with internal threads 33 of an object 31 the ends of the respective elements of the plug 11 are distorted in the manner indicated in Fig. 2. The fibers of the tubular jacket 13 are spread in all directions as this jacket is axially compressed, subject to the limitation on their displacement imposed by the presence of the tubular member 15 inside of the jacket 13. Since the tubular member 15 is made of malleable material, its opposite ends are also compressed axially and somewhat distorted by engagement with the internal threads 33, although such distortion is limited by the presence of the elongated rod 17. The rod 17 made of resilient material has threads cut in its end portions by engagement with the internal threads 33 and in the course of this cutting operation the rod 17 may be turned and twisted within the tubular element 15 so that it is dynamically stressed under bending and torsion loads along its longitudinal axis and is forced into engagement at various points along its length with the inner surface of the tubular element 15 and at both ends with the faces of threads 33.

The present invention offers an advantage over known types of thread locking plugs of homogeneous material in that it uses a plurality of elements each composed of a different material with different physical characteristics which enable these elements to cooperate to produce an increased locking effect and develop greater holding power to resist rotation, especially under vibration, than can a homogeneous plug.

Both the diameter and over-all length of the plug comprising the present invention may be changed as necessary to obtain maximum holding power under varying conditions encountered in different applications. The amount of different materials used in the respective elements may be changed as necessary to suit conditions under which is it to be used and the material used in the various elements may be chosen to obtain the most desirable physical characteristics including searing or galling qualities.

Obviously, many modifications and variations of the present invention are possible in the light of the above teachings. It is, therefore, to be understood that within the scope of the appended claims the invention may be practiced otherwise than as specifically described.

What is claimed is:

1. A locking device for retaining a threaded stud member in a blind hole, said device comprising an elongated generally cylindrical plug including three concentric contiguous layers of dissimilar material of length not less than the major diameter of the stud member and transversely extending through a cylindrical opening in a threaded portion of said stud member, the outermost layer being a woven tubular jacket of fibrous material with the fibers extending generally longitudinally of said plug, the intermediate layer of said plug being an elongated tubular element composed of a ductile, relatively soft homogeneous solid material, and the innermost layer being an elongated rod composed of a resilient relatively harder homogeneous solid material, whereby upon insertion of a threaded stud member in a blind hole, the ends of said plug are forcibly engaged with the internal threads of the hole and deformed so that the combined effect of the various layers is to provide substantially resistance to turning of the threaded stud member relative to the internal threads of the hole even under vibration loads.

2. A locking device for retaining a threaded bolt in an internally threaded hole, said device comprising an elongated plug of length not less than the major diameter of said threaded bolt and extending transversely of the bolt through an opening in a threaded portion thereof, said plug comprising three concentric contiguous layers, the central layer being composed of a resilient relatively harder homogeneous solid material, the next adjacent layer being composed of a ductile, relatively softer homogeneous solid material, and the outside layer being composed of an interwoven fibrous material with fibers extending generally longitudinally of said plug, whereby the opposite ends of said plug are forcibly engaged with the internal threads of the hole in which a bolt containing said plug is threadably engaged, thereby providing increased resistance to rotation.

References Cited in the file of this patent

UNITED STATES PATENTS

| 2,329,994 | Kingman | Sept. 21, 1943 |

FOREIGN PATENTS

| 124,746 | Great Britain | Jan. 29, 1920 |
| 372,405 | Great Britain | May 9, 1932 |